United States Patent [19]

Robinson

[11] 4,356,349
[45] Oct. 26, 1982

[54] ACOUSTIC IMAGE ENHANCING METHOD AND APPARATUS

[75] Inventor: Richard P. Robinson, Wallingford, Conn.

[73] Assignee: Trod Nossel Recording Studios, Inc., Northford, Conn.

[21] Appl. No.: 129,752

[22] Filed: Mar. 12, 1980

[51] Int. Cl.³ ............................ G11B 3/74; H04R 5/04
[52] U.S. Cl. ........................................ 179/1 G; 369/88
[58] Field of Search ............. 179/1 G, 1 GA; 369/88, 369/86, 49

[56] References Cited

U.S. PATENT DOCUMENTS

| | | | |
|---|---|---|---|
| 2,093,540 | 9/1937 | Blumlein | 369/86 |
| 2,836,662 | 5/1958 | Vanderlyn | 179/1 G |
| 2,845,491 | 7/1958 | Bertram | 179/1 G |
| 3,236,949 | 2/1966 | Atal et al. | 179/1 G |
| 3,560,656 | 2/1971 | Gilbert | 179/1 G |
| 3,892,624 | 7/1975 | Shimada | 179/1 G |
| 3,970,787 | 7/1976 | Searle | 179/1 AT |
| 4,027,101 | 5/1977 | De Freitas et al. | 179/1 GQ |
| 4,058,675 | 11/1977 | Kobayashi et al. | 179/1 G |
| 4,069,394 | 1/1978 | Doi et al. | 179/1 G |
| 4,139,728 | 2/1979 | Maramoto et al. | 179/1 G |
| 4,149,036 | 4/1979 | Okamoto et al. | 179/1 G X |
| 4,159,397 | 6/1979 | Iwahara et al. | 179/1 GQ |
| 4,218,585 | 8/1980 | Carver | 179/1 G |

Primary Examiner—Thomas W. Brown
Attorney, Agent, or Firm—St. Onge, Steward, Johnston & Reens

[57] ABSTRACT

A method and apparatus are described for processing audio signals in a particular manner to achieve an enhancement in the perceived sound when the processed audio signals are projected by audio transducers. A predetermined low frequency band of the audio signals is delayed by a time period which is generally less than the refractory period of the human ear and combined with out-of-phase cross-field portions within a particular amplitude range. A predetermined low frequency boost is applied generally of the order of about 3 db. Several embodiments are described to provide improved recordings or enhanced acoustic projections of conventional stereo recordings.

21 Claims, 6 Drawing Figures

ACOUSTIC IMAGE ENHANCING METHOD AND APPARATUS

FIELD OF THE INVENTION

This invention relates to a method and apparatus for enhancing the perception of acoustic sound. More specifically, this invention relates to a method and apparatus for enhancing sound from stereo recordings.

BACKGROUND OF THE INVENTION

Since the development of binaural or stereo sound, many techniques have been proposed to enhance the quality of the sound as it is perceived by the listener. Commencing with the 1933 British Pat. No. 394,325 to Blumlein, a sound enhancing technique is described employing a pair of spaced microphones whose output signals are applied to sum and difference networks. The difference signal is applied to a reactive network for the purpose of shifting the phase of low frequencies to such an extent (about 90 degrees) that the phase differences at low frequencies of the microphone signals are converted to amplitude differences on the output of the Blumlein network.

The phase to amplitude conversion in the Blumlein circuit is achieved by employing a substantial phase shift at low frequencies. Such phase shift corresponds with a large time delay. At high frequencies, such as above about 700 Hz, the phase shift becomes negligible and the Blumlein network reproduces the input signals with substantially the same relative amplitude relationship.

In British Pat. No. 781,186 to Philip B. VanDerLyn, a pair of input signals such as obtained from spaced apart microphones are subjected to an attenuating network whereby low frequencies are emphasized without phase shift. In U.S. Pat. No. 3,560,656 a circuit is described whereby a monaural signal is split into two separate components, one of which is phase shifted from the other by a substantial amount over a wide frequency range to simulate a stereophonic signal.

The U.S. Pat. Nos. 3,892,624 to Shimada and 4,069,394 to Doi et al describe stereophonic sound reproducing systems wherein portions of the input signals are cross-fed in out-of-phase relationship. The '624 patent describes a specific technique applicable when the speakers are located close to each other in a common cabinet. The '394 patent teaches a cross-feed network which also introduces a large phase shift. Similarly, the U.S. Pat. No. 4,194,036 to Okamoto et al provides a cross-feed circuit applicable to a stereo reproduction system employing substantial phase shifts and thus also substantial time delays. The U.S. Pat. No. 4,027,101 to Feitas et al teaches an audio system wherein concert hall reverberation effects are simulated with substantial time delays.

Many of these prior art techniques achieve various degrees of quality stereophonic reproduction. The quality is a subjective standard because human perception of sound and music is subjective. The human hearing system, however, is on the average able to distinguish various stereophonic reproduction systems and assign quality evaluations to these. For example, the sound may appear flat or full, directional or omnidirectional and full of ambience. The sound may appear blurred or the instruments clearly distinguishable. On the whole the sound may appear pleasant or disturbing. When experts provide rigid technical techniques to characterize what kind of sound is pleasing, effective or beautiful, they usually rely upon a statistical sample of different persons to establish their conclusions.

Various observations have been made and confirmed by experimenters. For example, it is well known and accepted that generally below about 700 Hz the human hearing system derives directivity from phase differences of the sound reaching a person. Above that frequency directivity is derived from amplitude differences. In the Blumlein patent, advantage is taken of that information to enhance the phase shift of microphone signals artificially at low frequencies and thus achieve an alleged enhancement in the quality of the sound.

The effects of sound upon a person and the ability to discern different echoes, instruments and recreate a mental image of the sound involves a complex interplay between the hearing elements, i.e. the earflap, canal, and ear drum and the mind which processes the information. Observations or experimental investigations often, therefore, involve a large number of observers to obtain a dependable statistically valid conclusion. As examples of the types of analyses of human acoustic responses can be found in publications such as those of the Journal of The Audio Engineering Society, see for instance the Haas effect article republished at page 146 of the March 1972 (Volume 20) issue, and a publication entitled Music, Sound and Sensation by Fritz Winckel and published by Dover Publications, 1967, a translation of a work by Max Verlag. Of particular interest in the latter publication is a graph shown in FIG. 111 wherein various psychoacoustic effects are characterized as a function of frequency and time. Thus, the refractory period (the time while nerves do not respond to stimuli) of the hearing nerves generally extends from about 0.6 to about 1.3 milliseconds (ms) and stereo delay times from about one to three ms.

SUMMARY OF THE INVENTION

With a network in accordance with the invention, stereo signals may be processed in a particular manner to achieve a remarkable enhancement in the perception of the sound when it is projected by audio transducers such as loudspeakers or earphones. The enhancement of the stereo signals results in the perception of a substantial spreading of the sound wherein the instruments can be more clearly distinguished and a highly pleasing effect is obtained.

As described herein for a particular embodiment in accordance with the invention, an enhancement in acoustic imagery is obtained by combining stereo signals with delayed versions thereof and with a predetermined cross-feed of out-of-phase portions. The delays employed are of short durations, generally selected to significantly enhance the spatial image perceived of the audio transducers and may be of the order of generally less than the refractory period of the human ear. The delays are preferably made applicable to a low frequency segment of the stereo signals to effect a subtle enhancement of the sound emanating from the audio transducers. The cross-feed of the out-of-phase portions is further selected in a predetermined manner within a particular range to achieve a highly pleasing effect whereby sound is perceived as omnidirectional.

With signal enhancement techniques in accordance with the invention, composite audio output signals, in one embodiment thereof, are composed of the original input signals, slightly delayed versions thereof with low frequency emphasis and out-of-phase cross-feed portions of the delayed and original input signals. These composite signals may then be used to make a recording such as on a magnetic tape or disc medium or can be applied to audio transducers such as speakers or earphones for acoustic projection or be used for transmission over radio or television channels.

The enhancement of the acoustic imagery perceived with the invention is remarkable and has been immediately recognized by listeners. The description of their perceptions include: "sound appears everywhere", "overall clarity is increased", "retrieves detail from records that would not otherwise be heard", "a clean bright sound", "it makes every note sound necessary", "makes the sound come alive", "the sound surrounds one", creates a bright clean listening experience", "the sound appears warmer and at the same time brighter", "it brings out every nuance of every instrument", "it adds a new dimension to the sound and appears to 'fill up' the entire room", "any stereo system can be improved with it".

It is, therefore, an object of the invention to provide a method and apparatus for modifying audio signals to enhance the acoustic imagery perceived when the modified signals are projected by audio transducers. It is a further object of the invention to provide a method for making a recording of audio signals which have been modified to enhance the acoustic perception of audio played back from the recording. It is still further an object of the invention to provide an apparatus for enhancing the playback of a stereo recording.

These and other objects and advantages of the invention can be understood from the following description of several embodiments described in conjunction with the following drawings.

DETAILED DESCRIPTION OF FIGURES

Figures 1, 1A:
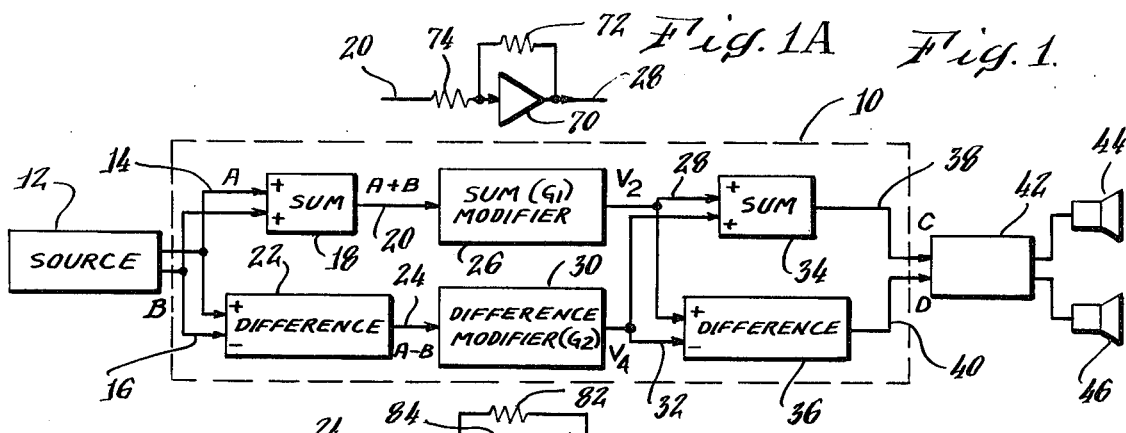
FIG. 1 is a schematic block diagram of an apparatus in accordance with the invention.
FIG. 1A is a schematic of a sum modifier shown in FIG. 1.

With reference to FIG. 1, an apparatus 10 in accordance with the invention is shown. A source 12 of audio signals such as from a stereo receiver, tape or disc playback device or the like provides a pair of stereo signals A and B on lines 14, 16. The source 12 is generally well known and need not be described with further detail.

The stereo signals A, B are applied to apparatus 10 which includes networks whose functions are similar to those described in the aforementioned Blumlein patent, except that certain parameters have been selected to achieve the remarkable sound enhancement in accordance with the invention.

Thus, the A, B audio signals are applied to a summing network 18 which produces the sum A+B on output line 20 and to a difference network 22 to generate the difference A−B on output line 24. The sum signal A+B is altered in magnitude by a modifier network 26 having a transfer function $G_1$ to produce on output line 28 a signal $V_2$. In the embodiment of FIG. 1, the transfer function $G_1$ is equal to about a half so that the audio signal $V_2$ has a value equal to the average between A and B.

The difference signal A−B is applied to a modifier network 30 having a transfer function $G_2$ to produce an audio signal $V_4$ on output line 32. The modifier network 30 has a transfer function selected to introduce a small time delay, TD, for low frequencies, a low frequency amplitude emphasis of a predetermined amount and a predetermined gain. The modified audio signals $V_2$, $V_4$ are applied to a summing network 34 and difference network 36 to reconstruct composite audio signals C, D on output lines 38, 40 formed of the original signals A, B, delayed versions thereof and out-of-phase cross-feed portions.

The composite audio signals C, D are shown applied to a dual channel amplifier 42 to drive a pair of loudspeakers 44, 46. Alternatively, the composite audio signals may be recorded on a tape or master phonograph record from which duplicates may be made following well known techniques.

Figures 1B, 2:
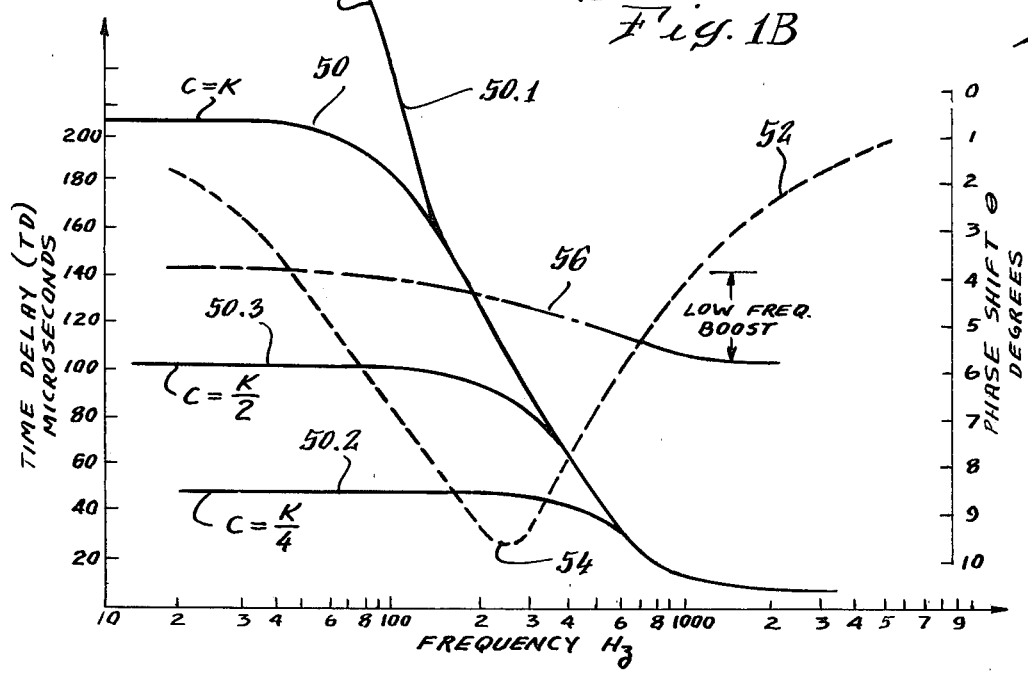
FIG. 1B is a schematic of a difference modifier shown in FIG. 1.
FIGS. 2 and 3 are plots of various characteristics of an apparatus as shown in FIG. 1, with FIG. 2 illustrating plots as a function of frequency and FIG. 3 showing plots as a function of the desirability of the sound enhancement effect achieved with the invention.

The modifier network 30 introduces a time delay for low frequencies following a frequency curve generally as shown by curve 50 in FIG. 2. This shows a time delay of the order of about 200 microseconds below about 100 Hz and a gradual fall-off above 100 Hz to negligible values. Such time delay may be achieved with a phase shift which varies in the manner as shown with curve 52 in FIG. 2. The phase shift is illustrated to vary as a function of frequency from a low value of the order of about 2 degrees at about 30 Hz to a maximum at 54 of about 9 degrees at 250 Hz and then back to a low level above that frequency.

Modifier network 30 further provides a low frequency emphasis or boost in a form as suggested by curve 56 in FIG. 2. This low frequency boost is preferably of the order of about 3 db as compared between signal levels at 50 Hz and about 1000 Hz with a gradual roll-off as illustrated starting at about 100 Hz.

Network 30 further has a gain of such magnitude that the output composite audio signals C and D are provided with substantial portions of time delayed and low frequency emphasized versions of the original audio signals A and B respectively as well as substantial portions of out-of-phase cross-feeds. This aspect of apparatus 10 may be particularly apreciated from the following analysis in which $G_1$ and $G_2$ are respectively the transfer functions for modifier networks 26 and 30. Thus, the composite signals C and D may be expressed as:

$$C = G_1(A+B) + G_2(A-B) \quad (1)$$

$$D = G_1(A+B) + G_2(B-A) \quad (2)$$

which can be rewritten as $$C = G_1[A(1+G_2/G_1) + B(1-G_2/G_1)] \quad (3)$$

$$D = G_1[B(1+G_2/G_1) + A(1-G_2/G_1)] \quad (4)$$

In the embodiment shown in FIG. 1, the transfer function $G_1$ may be a real number and $G_2$ complex to obtain the desired time delay. The ratio $G_2/G_1$ is so selected that each composite audio signal C and D includes substantial portions of out-of-phase cross-feeds as well as delayed versions of the original audio signals. Thus, composite signal C is formed of the original audio signal A, its delayed version as determined by the ratio $G_2/G_1$, and a cross-feed of the B audio signal. The latter cross-feed includes some of the original B audio signal on line 16 and an out-of-phase portion whose magnitude is determined by the ratio $G_2/G_1$.

In the embodiment of FIG. 1, the preferred ratio of $G_2/G_1$ is a complex number whose values depend upon the relative phase shift between $G_2$ and $G_1$. Since the phase shift as illustrated with curve 52 in FIG. 2 is small at about 1000 Hz, the ratio $G_2/G_1$ at that frequency is primarily determined by the absolute ratio of the amplitudes of the transfer functions.

The selection of the low frequency boost, the magnitude of the time delay, and the proportion of delayed portions and out-of-phase portions (the ratio $G_2/G_1$ at 1000 Hz) have been found to greatly affect the imagery perceived of the projected sound. The selection of these parameters preferably is made on a subjective basis by comparison with a conventional stereo acoustic projection of the original audio signals A and B. Since the impression of such comparison may vary between individuals, the optimum values for the circuit parameters of apparatus 10 may vary; however, the trend of such comparison does show a peak in the desirability or pleasing nature of the effect of the invention upon the listener.

Figure 3:
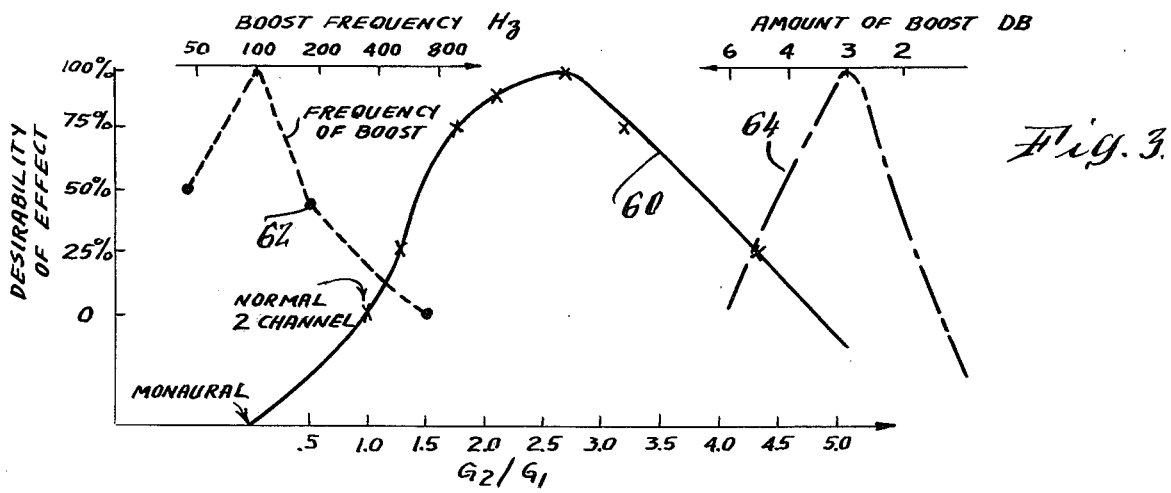

Thus, with reference to FIG. 3, a plurality of curves are shown wherein the independent variable varies along the abscissa and the ordinate represents a subjective impression of the perceived acoustic imagery in terms of most effective at 100% and diminishing effectiveness below that in increments of 25%.

When the ratio $G_2/G_1$ (relative to 1000 Hz) was varied, an optimum range with a peak was found to exist as illustrated with curve 60. Good acoustic imagery was perceived with ratios for $G_2/G_1$ between about 1.6 and about 3.2. Acceptable acoustic enhancement may occur over a wider range of ratios, say from about 1.4 to about 4.3 corresponding to an estimated 25% achievement of the optimum enhancement. This range of ratios provides that the cross-feed portion (all of the B audio signal in the C composite signal and all of the A signal in the D audio signal) occupies from about 20% to about 65% in the composite signals, with a preferred range from about 25 to about 50%. At these $G_2/G_1$ ratios, the delayed and undelayed versions of the audio input signals provide from about 80 to 35 percent for a broad range and 75 to 50% for a preferred range of the composite signals with the balance provided primarily by the cross-feed.

At the lower $G_2/G_1$ ratios such as 1, normal stereo projection is obtained while at higher values, above about 4.3, special effects occur with substantial balance shifts and generally result in sound which is unacceptable by most people. A peak or most pleasing effect was obtained at a $G_2/G_1$ ratio of about 2.7 and with about 60 percent of the composite signals represented by delayed and undelayed versions of the original audio input signals and the balance of about 40% contributed primarily by the out-of-phase cross feed portion.

Substituting the optimum $G_2/G_1$ values in the relationships (3) and (4) above yields in each composite audio signal a substantial portion of an out-of-phase time-delayed cross-feed. The amplitude of the cross-feed may be in the range from about fifty to about seventy-five percent of the magnitude of the other part of the composite signal.

The slight time delay introduced in the composite audio signals appears to add a significant three dimensional perception of the sound. Enhanced acoustic imagery can be obtained without time delay, but preferably the delay is present for both the in-phase and out-of-phase audio signal portions in the composite signals. When the time delay is increased beyond a value of the order of about a half millisecond at a low frequency of about 30 Hz such as with curve 50.1 in FIG. 2, the acoustic enhancement effect appears to diminish. Similarly, below time delays of about fifty microseconds, curve 50.2, little acoustic enhancement can be perceived. Since the increased time delays were accompanied by a change in the frequency position of curve 56 in FIG. 2, i.e. higher for longer time delays, the longer time delays also caused a noticeable undesired shift in the tonal balance.

The perceived acoustic enhancement was found sensitive to both the amount of low frequency boost and the frequency below which the boost appeared. Curve 62 illustrates a preferred frequency range of between about 50 Hz and 200 Hz for the upper limit of low frequency emphasis with about 100 Hz optimum value. The preferred magnitude of the low frequency boost appeared as shown by curve 64 to be in the range from about 2 to about 4 db with 3 db an optimum value. Above 4 db the frequency balance appears upset, leaving a generally unpleasant effect. Below 2 db, because of the nature of the circuit used, the beneficial effect of the time delay is reduced.

With an apparatus 10 formed in accordance with the invention and using the optimum parameters as described, a significant enhancement in the perception of the acoustic sound is obtained. When the apparatus is used with audio signals from a stereo record, it is as if previously unknown recorded stereo information has been unlocked and a full breadth of available sound information projected to the listener. The modifier networks 26, 30 employed in the apparatus 10 of FIG. 1 may be as illustrated in FIGS. 1A and 1B. Thus, modifier 26 is formed with an operational amplifier 70 with a feedback resistor 72 of about 55 K ohms and an input resistor 74 of 100 K ohms, yielding a transfer function value of $G_1$ of 0.55.

The modifier network 30 can be formed with an operational amplifier 78 having a reactive feedback network 80. The latter network has an overall gain controlling resistor 82, of the order of 100 K ohms in parallel with a series circuit formed by resistor 84 and a capacitor 86. An input resistor 88 of the order of 47.5 K ohms sets the particular gain of the amplifier 78. Resistor 84 controls the amount of low frequency boost and phase shift and is of the order of 250 K ohms. The size of the capacitor determines the frequency below which the boost occurs and to some extent the amount of the time delay. The capacitor value was 2200 pico ($10^{-12}$) farads. With a network having these circuit values, optimum performance curves such as 50 (time delay), 52 (phase shift), 56 (amplitude), and the optimum points on perception curves of FIG. 3 were obtained. The time delay curves 50.1, 50.2 and 50.3 were obtained by changing the value of capacitor 86 respectively to 4400, 550 and 110 pico farads. When these different capacitor values were used, the phase shift curve 52 retained its general shape as shown in FIG. 2, but its position in the frequency domain was shifted towards lower frequencies for higher values of C and vice versa.

Figure 4:
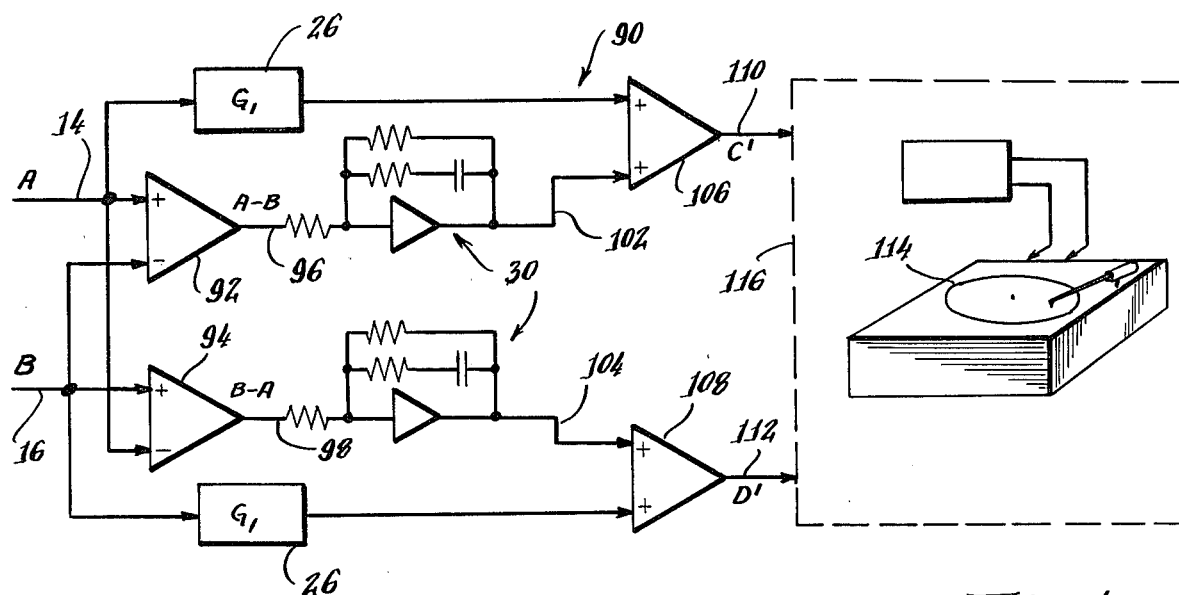
FIG. 4 is a schematic block diagram of another form of an apparatus in accordance with the invention.

FIG. 4 shows an alternate apparatus 90 in accordance with the invention. In this device both input audio signals A and B on input lines 14, 16 are applied to difference circuits 92, 94 to generate respectively difference signals A−B on output 96 and B−A on output 98. Both difference signals are then applied to modifier networks such as 30 having a transfer function $G_2$. The modified outputs on lines 102, 104 are combined with amplitude modified versions of original audio signals A and B or in summing networks 106, 108. The latter's outputs 110, 112 bear composite audio signals C' and D' similar to C and D in FIG. 1. The composite audio signals may be used, for example, to form a master record 114 on a recording apparatus 116 for subsequent mass production.

The composite signals C' and D' may be expressed in accordance with the following relationship:

$$C' = G_1[A(1+G_2/G_1) - G_2 B/G_1] \qquad (5)$$

$$D' = G_1[B(1+G_2/G_1) - G_2 A/G_1] \qquad (6)$$

The relationships (5) and (6) are different from (3) and (4) which are applicable to the apparatus 10 of FIG. 1. However, to a substantial extent, the same acoustic enhancement is achieved with the embodiment of FIG. 4, though perhaps with somewhat reduced omnidirectional effect.

Figure 5:
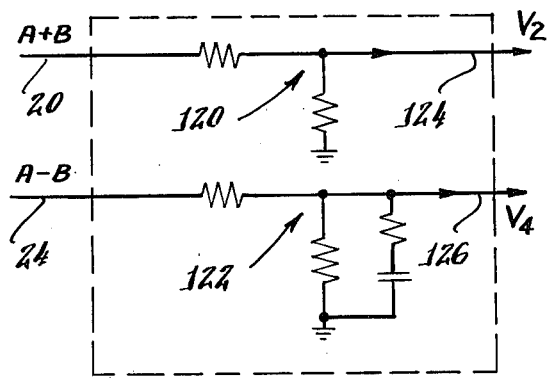
FIG. 5 is a passive circuit for enhancing stereo signals in accordance with the invention.

FIG. 5 illustrates passive networks 120, 122 operating on sum and difference audio signals A+B and A−B as on lines 20, 24 in FIG. 1. Networks 120, 122 are the equivalents of modifiers 26, 30 respectively and their outputs 124, 126 are applied, as in FIG. 1, to sum and difference circuits 34, 36.

Having thus described several embodiments of the invention for enhancing the acoustic imagery of audio signals, the remarkable effects of the invention can be appreciated. For example, the invention, by virtue of its ability to create a spatial spread-out perception of the projected sound, acts as a much improved time to spatial angle converter. This advantageous characteristic can be explained with reference to FIG. 6 in which a pair of spaced apart loudspeakers 44, 46 are shown in a horizontal plane spaced from a centrally stationed listener, L.

Figure 6:
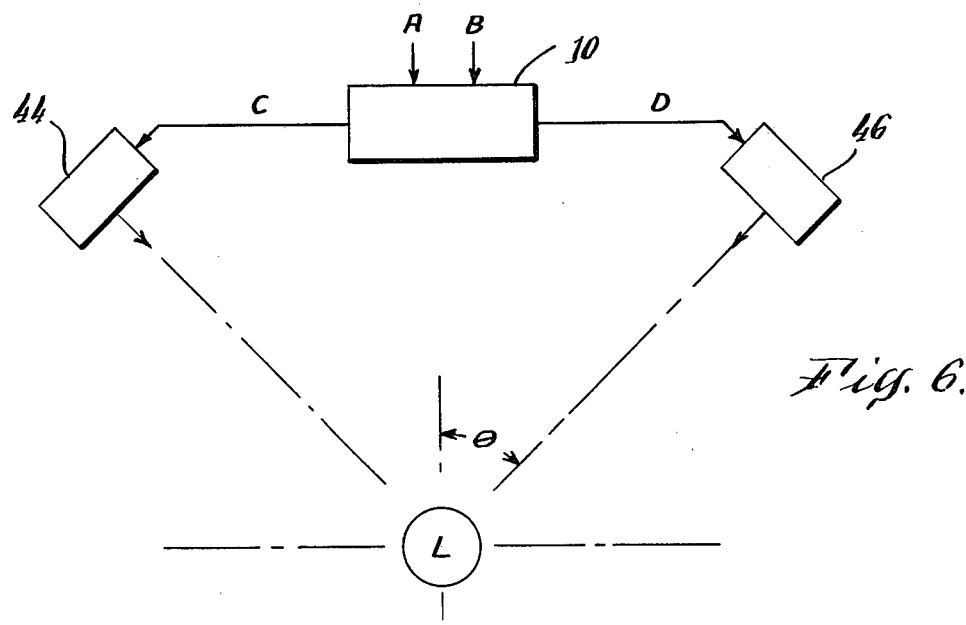
FIG. 6 is a diagrammatic plan view of a sound projection system employing the invention.

In a conventional sound projection system without the use of the invention, spatial perception of the sound from the speakers 44, 46 is primarily a function of relative amplitudes of the sound. When the ratio A/B of the input audio signals is one, the sound appears centered and as the ratio is increased, the sound moves towards speaker 44. Generally, at a ratio in excess of 10 (20 db) the sound is at a maximum spatial angle, $\theta$, relative to listener L. This maximum angle $\theta$ is 45 degrees when the speakers 44, 46, as shown in FIG. 6, are oriented at an angle of 90 degrees relative to each other. The angle $\theta$ is generally independent of the duration of the input signals A and B.

With the inclusion of an acoustic image enhancing device in accordance with the invention, the perceived spatial angles rapidly exceed 45 degrees at relatively low input audio signal ratio levels. This perception increases significantly as the duration of the sound increases. For example, when the input signal has a duration generally longer than about several milliseconds, the perceived spatial angle may approach 90 degrees and in some cases even greater at relatively low input signal ratios. As a result, sustained or reverberated sounds, which in an original recording were imaged at, for example, 45 degrees, may now be perceived to be imaged at 90 degrees or more. This time to angle conversion is pleasing to the listener who is able to perceive subtleties of many reflections and sustained waveforms and thus receives an impression of enhanced clarity in the sound and is able to more clearly distinguish different instruments.

Having thus described several embodiments for practicing the invention, its advantages can be appreciated. The more specific ranges and component values described herein have been presented to provide a precise teaching of the invention and practical ranges in which the remarkable effect can be discerned. The time delay may be provided by a circuit which does not vary with frequency such as by a digital time delay circuit. Since the perception of the acoustic imagery may differ for different persons, the indicated ranges may vary and the scope of the invention should be determined by the following claims.

What is claimed is:

1. In an apparatus for modifying first and second audio signals to enhance the acoustic imagery perceived when the modified audio signals are projected by audio transducers and wherein said apparatus includes a summing network for generating a sum signal representative of the sum of said first and second audio signals and a difference network for generating a difference signal representative of the difference between the first and second audio signals, said apparatus further including a second summing network and a second difference network to produce first and second composite audio signals, the improvement comprising:

means for time delaying the difference signal and the sum signal relative to each other for a time period which is generally less than the refractory period of the human ear in the range from about fifty to about five hundred microseconds over a frequency range generally below about five hundred Hertz to significantly enlarge the spatial image perceived of the sound emanating from said audio transducers;

means for modifying the amplitudes, as determined at a high frequency, of said sum and difference signals so that the amplitude of the relatively delayed one thereof exceeds the amplitude of the other by a ratio selected in the range from about 1.4 to about 4.3; and means for coupling the time delayed and amplitude modified sum and difference signals to the second summing and second difference networks in a manner for generating said composite first and second audio signals capable of generating said enhanced acoustic imagery.

2. The improvement for enhancing the acoustic imagery as set forth in claim 1 wherein said amplitude modifying means provides said ratio selected in a range extending from about 1.6 to about 3.2.

3. The improvement for enhancing the acoustic imagery as set forth in claim 1 wherein the time delaying means provides a time delay of the order of about two hundred microseconds and operative on frequencies extending below about one hundred Hertz and wherein said amplitude modifying means provides said ratio of the order of about 2.7.

4. The improvement for enhancing the acoustic imagery as set forth in claim 1, 2 or 3 wherein the time delaying means includes means for emphasizing the amplitude of low frequencies in said first and second composite signals over a frequency range extending generally below about five hundred Hertz and for a predetermined amount.

5. The improvement for enhancing the acoustic imagery as set forth in claim 4 wherein the time delaying means increases the amplitude of low frequencies by said predetermined amount, which is in the range extending between about two to about four decibels.

6. The improvement for enhancing the acoustic imagery as set forth in claim 5 wherein the time delaying means increases said low frequencies amplitudes by about three decibels.

7. An apparatus for modifying first and second audio signals to enhance the acoustic imagery perceived when the modified audio signals are projected by audio transducers comprising means for time delaying the first and second audio signals as a function of frequency in a predetermined manner, with the delay selected generally less than the refractory period of the human ear in the range from about fifty to about five hundred microseconds and with the delay operative over a frequency range below about five hundred Hertz;

means for generating a first composite signal formed of undelayed and delayed first audio signals and an out-of-phase delayed cross-feed of said second audio signal, the amplitude ratios of said delayed first audio signal, and of said delayed out-of-phase second audio signal cross-feed, relative to the undelayed first audio signal being each in the range from about 1.4 to about 4.3 as determined at a high frequency; and means for generating a second composite signal formed of undelayed and delayed second audio signals and an out-of-phase delayed cross-feed of said first audio signal, the amplitude ratios, of said delayed second audio signal, and said delayed out-of-phase first audio signal cross-feed, relative to the undelayed second audio signal being each in the range from about 1.4 to about 4.3 as determined at a high frequency;

whereby said first and second composite signals when applied to said audio transducers significantly enlarge the spatial image perceived of the sound emanating therefrom.

8. The apparatus for enhancing the acoustic imagery as set forth in claim 7 and wherein said generating means each generate a said ratio which lies in a range from about 1.6 to about 3.2.

9. The apparatus for enhancing the acoustic imagery as set forth in claim 8 wherein said generating means provide said ratios of about 2.7 and said time delaying means produces a delay of about two hundred microseconds.

10. A method for forming an audio stereo recording with first and second audio signals to enhance the acoustic imagery perceived when the audio recording is played back on audio transducers comprising the steps of:

delaying the first and second audio signals by a predetermined relatively short time period generally less than the refractory period of the human ear in a range extending from about fifty to about five hundred microseconds and with the delay operative over a frequency range extending below about five hundred Hertz;

combining the first and second audio signals respectively with said delayed first and second audio signals to generate first and second composite signals wherein the amplitude ratios of the delayed portions with respect to undelayed audio signals in each of said composite signals are in the range from about 1.4 to about 4.3 as determined at a high frequency; and recording the first and second composite signals on a recording medium to form a stereo recording capable of producing, when played back through audio transducers, an enhanced spatial perception of the played back sound.

11. The method for forming an audio stereo recording as set forth in claim 10 wherein said combining step employs said ratios in the range from about 1.6 to about 3.2.

12. The method for forming an audio stereo recording as set forth in claim 11 wherein the delay time period is of the order of about two hundred microseconds and said ratios are each about 2.7.

13. The method for forming an audio stereo recording as set forth in claim 10, 11 or 12 wherein the combining step further comprises:

boosting amplitudes of low frequencies in said first and second composite signals and occurring below about five hundred Hertz in the range of from about two to about four decibels relative to higher frequencies.

14. The method for forming an audio stereo recording as set forth in claim 13 wherein said boosting step boosts the amplitude of said low frequencies by about three decibels.

15. A method for forming an audio stereo recording with first and second audio signals to enhance the acoustic imagery perceived when the audio recording is played back on audio transducers comprising the steps of delaying the first and second audio signals by a predetermined relatively short time period in the range from about fifty to about five hundred microseconds and with the delay affecting signal frequencies below about five hundred Hertz;

combining the undelayed first audio signal with said delayed first audio signal and a preselected portion of the delayed second audio signal, said latter portion being substantially in out-of-phase relationship with the undelayed second audio signal and forming a first composite signal wherein the amplitude ratios, of said delayed first audio signal, and of said delayed out-of-phase second audio signal cross-feed, relative to the undelayed first audio signal being each in the range from about 1.4 to about 4.3 as determined at a high frequency;

combining the undelayed second audio signal with said delayed second audio signal and a preselected portion of the delayed first audio signal, said latter portion being substantially in out-of-phase relationship with the undelayed first audio signal and forming a second composite signal wherein the amplitude ratios, of said delayed second audio signal, and of said delayed out-of-phase first audio signal cross-feed, relative to the undelayed second audio signal being each in the range from about 1.4 to about 4.3 as determined at a high frequency; and recording the first and second composite signals to form a stereo recording capable of producing, when played back through audio transducers, an enhanced spatial perception of the played back sound.

16. The method for forming an audio stereo recording as set forth in claim 15 wherein the combining steps each provide said amplitude ratios in the range from about 1.6 to about 3.2.

17. The method for forming an audio stereo recording as set forth in claim 15 wherein the combining steps each provide said amplitude ratios of about 2.7 and wherein said delaying step provides a delay of about two hundred microseconds.

18. The method for forming an audio stereo recording as set forth in claim 15, 16, or 17 wherein the low frequencies of said first and second composite signals below about 400 Hertz are boosted in amplitude in a range extending from about two to about four decibels relative to higher frequencies.

19. An apparatus for modifying first and second audio signals to enhance the acoustic imagery perceived when the modified audio signals are projected by audio transducers comprising
means for generating a first composite signal composed of said first audio signal and a predetermined cross-feed portion being substantially out-of-phase with the second audio signal with a magnitude in the range from about twenty to about fifty-five percent of the first composite signal;
means for generating a second composite signal composed of said second audio signal and a predetermined cross-feed portion of the first audio signal, said cross-feed portion being substantially out-of-phase with the first audio signal and in the range from about twenty to about fifty-five percent of the second composite signal; and
means for delaying the first and second audio signals a predetermined time period of generally less than the refractory period of the human ear and in the range from about fifty to about five hundred microseconds over frequencies below about five hundred Hertz, said delayed first and second audio signals being so applied to be respectively combined within said first and second composite signal generating means,
whereby said first and second composite signals, when projected by audio transducers, provide an enhancement of the perceived acoustic imagery.

20. An apparatus for modifying first and second audio signals comprising;
means for generating a time delayed difference signal which represents the difference between the first and second audio signals, with a time delay which is generally less than the refractory period of the human ear and extends from about fifty to about five hundred microseconds at frequencies below about five hundred Hertz;
means for generating a sum signal which represents an addition of the first and second audio signals;
means for generating a first composite signal representative of the sum between the time delayed difference signal and the sum signal for acoustic projection thereof; and
means for generating a second composite signal representative of the difference between the time delayed difference signal and the sum signal, with the amplitudes of said time delayed difference signal and said sum signal being selected so that a respective ratio therebetween is within a range extending from about 1.4 to about 4.3,
whereby said first and second composite signals provide, when projected by audio transducers, an enhancement of the perceived acoustic imagery.

21. The apparatus as claimed in claim 20 wherein the amplitudes of said time delayed difference signal and said sum signal are selected so that a respective ratio therebetween is within the range extending from about 1.6 to about 3.2.

* * * * *